US012677345B2

(12) United States Patent
Wheelock et al.

(10) Patent No.: US 12,677,345 B2

(45) Date of Patent: Jul. 7, 2026

(54) SYSTEM AND METHOD TO OPERATE A RADIO ON SEVERAL FREQUENCY BANDS

(71) Applicant: Thomson Licensing, Cesson-Sevigne (FR)

(72) Inventors: Ian G. Wheelock, Cork (IE); Charles Peter Cheevers, Alpharetta, GA (US); James R. Flesch, Doraville, GA (US)

(73) Assignee: Thomson Licensing, Cesson-Sevigne (FR)

( * ) Notice: Subject to any disclaimer, the term of this patent is extended or adjusted under 35 U.S.C. 154(b) by 907 days.

(21) Appl. No.: 17/831,762

(22) Filed: Jun. 3, 2022

(65) Prior Publication Data

US 2022/0400530 A1 Dec. 15, 2022

Related U.S. Application Data

(60) Provisional application No. 63/209,617, filed on Jun. 11, 2021.

(51) Int. Cl.
| | |
|---|---|
| *H04W 76/27* | (2018.01) |
| *H04W 72/0446* | (2023.01) |
| *H04W 74/00* | (2009.01) |
| *H04W 88/06* | (2009.01) |

(52) U.S. Cl.
CPC ....... *H04W 76/27* (2018.02); *H04W 72/0446* (2013.01); *H04W 74/002* (2013.01); *H04W 88/06* (2013.01)

(58) Field of Classification Search
CPC ............. H04W 76/27; H04W 72/0446; H04W 74/002; H04W 88/06; H04W 72/20; H04W 72/566; H04W 4/46
See application file for complete search history.

(56) References Cited

U.S. PATENT DOCUMENTS

| | | | | |
|---|---|---|---|---|
| 2019/0364566 A1* | 11/2019 | Husted | .................. | H04W 72/51 |
| 2021/0084711 A1* | 3/2021 | Park | .................. | H04W 72/0453 |
| 2021/0175971 A1* | 6/2021 | Vardarajan | ............ | H04W 16/26 |

OTHER PUBLICATIONS

International Preliminary Report on Patentability issued Nov. 21, 2023 in corresponding International (PCT) Application No. PCT/US2022/032112.

International Search Report and the Written Opinion of the International Searching Authority dated Sep. 9, 2022 in International (PCT) Application No. PCT/US2022/032112.

* cited by examiner

*Primary Examiner* — Hassan A Phillips
*Assistant Examiner* — Muhammad Ainul Huda
(74) *Attorney, Agent, or Firm* — James Shead; David Todd Shoneman; Michael A. Pugel

(57) ABSTRACT

A network device comprises a memory, a radio system, a control line, and a processor. The radio system can be controllably configured to operate in a first channel state or a second channel state. The first channel state enables transmission of first client device reception data on a first channel and reception of first client device transmission data on the first channel. The second channel state enables transmission of second client device reception data on a second channel and reception of second client device transmission data on the second channel. The control line is arranged to provide a control signal to the radio system so as to place the radio system in either the first channel state or the second channel state.

21 Claims, 7 Drawing Sheets

100

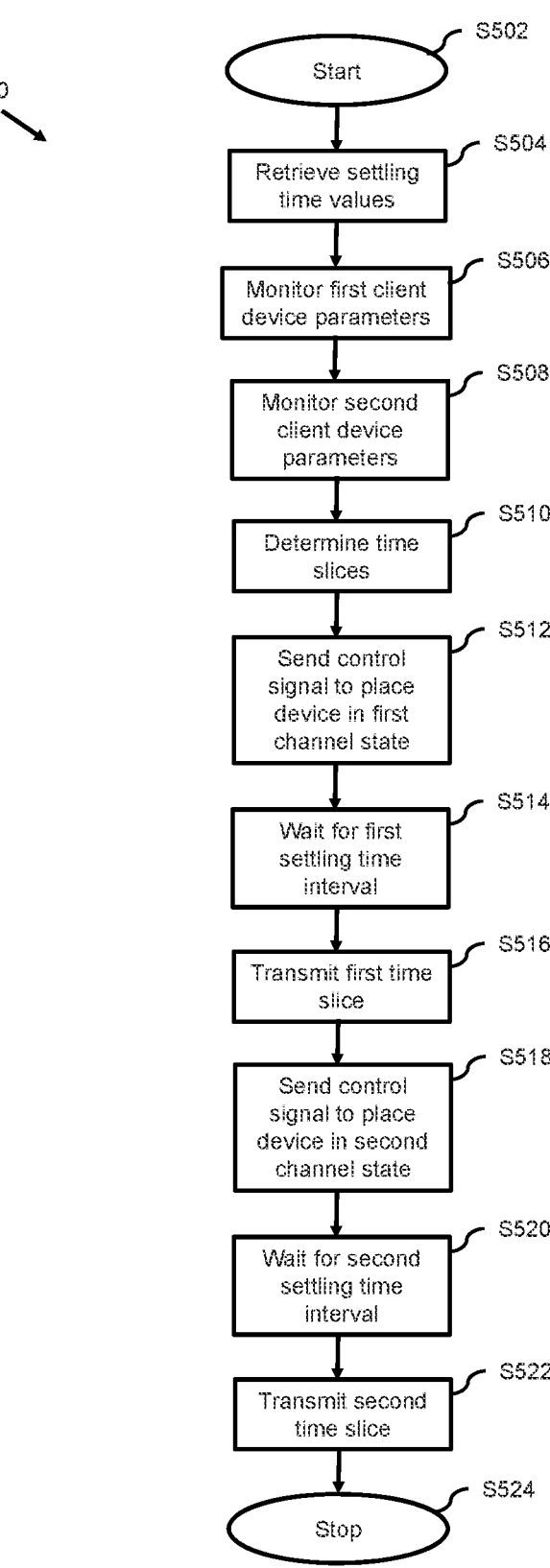

500

S502
Start

S504
Retrieve settling time values

S506
Monitor first client device parameters

S508
Monitor second client device parameters

S510
Determine time slices

S512
Send control signal to place device in first channel state

S514
Wait for first settling time interval

S516
Transmit first time slice

S518
Send control signal to place device in second channel state

S520
Wait for second settling time interval

S522
Transmit second time slice

S524
Stop

FIG. 5

SYSTEM AND METHOD TO OPERATE A RADIO ON SEVERAL FREQUENCY BANDS

BACKGROUND

Embodiments of the present disclosure relate to operating a network device on several frequency bands.

SUMMARY

Aspects of the present disclosure are drawn to a network device for use with a first client device and a second client device. The first client device is configured to transmit first client device transmission data on a first channel and to receive first client device reception data on the first channel. The second client device is configured to transmit second client device transmission data on a second channel and to receive second client device reception data on the second channel. The first channel is different from the second channel. The network device comprises a memory, a radio system, a control line, and a processor. The radio system can be controllably configured to operate in a first channel state or a second channel state. The first channel state enables transmission of the first client device reception data on the first channel and reception of the first client device transmission data on the first channel. The second channel state enables transmission of the second client device reception data on the second channel and reception of the second client device transmission data on the second channel. The control line is arranged to provide a control signal to the radio system so as to place the radio system in either the first channel state or the second channel state. The processor is configured to execute instructions stored on the memory to cause the network device to: monitor a first client device parameter associated with the first client device; monitor a second client device parameter associated with the second client device; determine a portion of time for which the radio system should be configured to operate in the first channel state based on the monitored first client device parameter and the monitored second client device parameter; generate the control signal to place the radio system in the first channel state based on the determined portion of time; and transmit the control signal to the radio system via the control line to place the radio system in the first channel state.

In some embodiments, the radio system comprises a medium access control (MAC) device, a physical layer (PHY) device, a radio frequency (RF) module, a filter bank, a power amplifier, and a low noise amplifier. The MAC device is configured to manage a link layer and frames associated with the first client device transmission data, the first client device reception data, the second client device transmission data, and the second client device reception data. The PHY device is configured to modulate the frames associated with the first client device transmission data and the second client device transmission data and to demodulate the frames associated with the first client device reception data and the second client device reception data. The RF module is configured to associate the first client device transmission data to the first channel, disassociate the first client device reception data from the first channel, associate the second client device transmission data to the second channel, and disassociate the second client device reception data from the second channel. The filter bank is controllably configured to operate in the first channel state or the second channel state. The power amplifier is configured to amplify the first client device transmission data and the second client device transmission data. The low noise amplifier is operable to amplify the first client device reception data and the second client device reception data. The control line is arranged to provide the control signal to the filter bank so as to place the filter bank in either the first channel state or the second channel state.

In some embodiments, the network device further comprises a MAC device control line, an RF module control line, and a PHY device control line. The processor is configured to execute instructions stored on the memory to additionally cause the network device to: generate a MAC device control signal to place the radio system in the first channel state based on the determined portion of time; generate an RF module control signal to place the radio system in the first channel state based on the determined portion of time; generate a PHY device control signal to place the radio system in the first channel state based on the determined portion of time; transmit the MAC device control signal to the MAC device via the MAC device control line to place the radio system in the first channel state; transmit the RF module control signal to the RF module via the RF module control line to place the radio system in the first channel state; and transmit the PHY device control signal to the PHY device via the PHY device control line to place the radio system in the first channel state.

In some embodiments, the radio system is configured to operate in a first GHz band in the first state and to operate in a second GHz band in the second state.

In some embodiments, the radio system is further configured to operate in a third GHz band while operating in the first state or the second state.

In some embodiments, the processor is configured to execute instructions stored on the memory to additionally cause the network device to: generate a second control signal to switch the radio system from the first channel state to the second channel state based on the portion of time; transmit the second control signal to the radio system via the control line to switch the radio system from the first channel state to the second channel state and to cause the radio system to operate in the second channel state after a settling time associated with a settling time value.

In some embodiments, the memory has the settling time value stored therein.

Other aspects of the present disclosure are drawn to a method of using a network device with a first client device and a second client device. The first client device is configured to transmit first client device transmission data on a first channel and to receive first client device reception data on the first channel. The second client device is configured to transmit second client device transmission data on a second channel and to receive second client device reception data on the second channel. The first channel is different from the second channel. The method comprises: monitoring, via a processor configured to execute instructions stored on a memory, a first client device parameter associated with the first client device; monitoring, via the processor, a second client device parameter associated with the second client device; determining, via the processor, a portion of time for which a radio system should be configured to operate in a first channel state based on the monitored first client device parameter and the monitored second client device parameter, the radio system being controllably configured to operate in the first channel state or the second channel state, the first channel state enabling transmission of the first client device reception data on the first channel and reception of the first client device transmission data on the first channel, the second channel state enabling transmission of the second client device reception data on the second channel and reception of the second client device transmission data on the second channel; generating, via the processor, the control signal to place the radio system in the first channel state based on the determined portion of time; and transmitting, via the processor, the control signal to the radio system via a control line to place the radio system in the first channel state.

In some embodiments, the radio system comprises a medium access control (MAC) device, a physical layer (PHY) device, a radio frequency (RF) module, a filter bank, a power amplifier, and a low noise amplifier. The MAC device is configured to manage a link layer and frames associated with the first client device transmission data, the first client device reception data, the second client device transmission data, and the second client device reception data. The PHY device is configured to modulate the frames associated with the first client device transmission data and the second client device transmission data and to demodulate the frames associated with the first client device reception data and the second client device reception data. The RF module is configured to associate the first client device transmission data to the first channel, disassociate the first client device reception data from the first channel, associate the second client device transmission data to the second channel, and disassociate the second client device reception data from the second channel. The filter bank is controllably configured to operate in the first channel state or the second channel state. The power amplifier is configured to amplify the first client device transmission data and the second client device transmission data. The low noise amplifier is operable to amplify the first client device reception data and the second client device reception data. Transmitting the control signal comprises transmitting the control signal to the filter bank so as to place the filter bank in either the first channel state or the second channel state.

In some embodiments, the method further comprises generating, via the processor, a MAC device control signal to place the radio system in the first channel state based on the determined portion of time; generating, via the processor, an RF module control signal to place the radio system in the first channel state based on the determined portion of time; generating, via the processor, a PHY device control signal to place the radio system in the first channel state based on the determined portion of time; transmitting, via the processor, the MAC device control signal to the MAC device via a MAC device control line to place the radio system in the first channel state; transmitting, via the processor, the RF module control signal to the RF module via a RF module control line to place the radio system in the first channel state; and transmitting, via the processor, the PHY device control signal to the PHY device via a PHY device control line to place the radio system in the first channel state.

In some embodiments, the method further comprises operating the radio system in a first GHz band in the first state and in a second GHz band in the second state.

In some embodiments, the method further comprises operating the radio system in a third GHz band while operating in the first state or the second state.

In some embodiments, the method further comprises generating, via the processor, a second control signal to switch the radio system from the first channel state to the second channel state based on the portion of time; and transmitting, via the processor, the second control signal to the radio system via the control line to switch the radio system from the first channel state to the second channel state and to cause the radio system to operate in the second channel state after a settling time associated with a settling time value.

In some embodiments, the memory of the method has the settling time value stored therein.

Other aspects of the present disclosure are drawn to a non-transitory, computer-readable media having computer-readable instructions stored thereon, the computer-readable instructions being capable of being read by a network device for use with a first client device and a second client device. The first client device is configured to transmit first client device transmission data on a first channel and to receive first client device reception data on the first channel. The second client device is configured to transmit second client device transmission data on a second channel and to receive second client device reception data on the second channel. The first channel is different from the second channel. The computer-readable instructions are capable of instructing the network device to perform the method comprising: monitoring, via a processor configured to execute instructions stored on a memory, a first client device parameter associated with the first client device; monitoring, via the processor, a second client device parameter associated with the second client device; determining, via the processor, a portion of time for which a radio system should be configured to operate in a first channel state based on the monitored first client device parameter and the monitored second client device parameter, the radio system being controllably configured to operate in the first channel state or the second channel state, the first channel state enabling transmission of the first client device reception data on the first channel and reception of the first client device transmission data on the first channel, the second channel state enabling transmission of the second client device reception data on the second channel and reception of the second client device transmission data on the second channel; generating, via the processor, the control signal to place the radio system in the first channel state based on the determined portion of time; and transmitting, via the processor, the control signal to the radio system via a control line to place the radio system in the first channel state.

In some embodiments, the computer-readable instructions are capable of instructing the network device to perform the method wherein the radio system comprises a medium access control (MAC) device, a physical layer (PHY) device, a radio frequency (RF) module, a filter bank, a power amplifier, and a low noise amplifier. The MAC device is configured to manage a link layer and frames associated with the first client device transmission data, the first client device reception data, the second client device transmission data, and the second client device reception data. The PHY device is configured to modulate the frames associated with the first client device transmission data and the second client device transmission data and to demodulate the frames associated with the first client device reception data and the second client device reception data. The RF module is configured to associate the first client device transmission data to the first channel, disassociate the first client device reception data from the first channel, associate the second client device transmission data to the second channel, and disassociate the second client device reception data from the second channel. The filter bank is controllably configured to operate in the first channel state or the second channel state. The power amplifier is configured to amplify the first client device transmission data and the second client device transmission data. The low noise amplifier is operable to amplify the first client device reception data and the second client device reception data. Transmitting the control signal comprises transmitting the control signal to the filter bank so as to place the filter bank in either the first channel state or the second channel state.

In some embodiments, the computer-readable instructions are capable of instructing the network device to perform the method comprising: generating, via the processor, a MAC device control signal to place the radio system in the first channel state based on the determined portion of time; generating, via the processor, an RF module control signal to place the radio system in the first channel state based on the determined portion of time; generating, via the processor, a PHY device control signal to place the radio system in the first channel state based on the determined portion of time; transmitting, via the processor, the MAC device control signal to the MAC device via a MAC device control line to place the radio system in the first channel state; transmitting, via the processor, the RF module control signal to the RF module via a RF module control line to place the radio system in the first channel state; and transmitting, via the processor, the PHY device control signal to the PHY device via a PHY device control line to place the radio system in the first channel state.

In some embodiments, the computer-readable instructions are capable of instructing the network device to perform the method wherein the radio system is configured to operate in a first GHz band in the first state and to operate in a second GHz band in the second state.

In some embodiments, the computer-readable instructions are capable of instructing the network device to perform the method further comprising operating the radio system in a third GHz band while operating in the first state or the second state.

In some embodiments, the computer-readable instructions are capable of instructing the network device to perform the method further comprising generating, via the processor, a second control signal to switch the radio system from the first channel state to the second channel state based on the portion of time; and transmitting, via the processor, the second control signal to the radio system via the control line to switch the radio system from the first channel state to the second channel state and to cause the radio system to operate in the second channel state after a settling time associated with a settling time value.

In some embodiments, the computer-readable instructions are capable of instructing the network device to perform the method wherein the memory has the settling time value stored therein.

BRIEF SUMMARY OF THE DRAWINGS

The accompanying drawings, which are incorporated in and form a part of the specification, illustrate example embodiments and, together with the description, serve to explain the principles of the present disclosure. In the drawings:

FIG. 5 illustrates a method of transmitting data over two frequency bands, in accordance with aspects of the present disclosure;

DETAILED DESCRIPTION

Internet-enabled devices such as computers, smart phones, tablets, smart speakers, home security devices, and others are ubiquitous in modern homes and workplaces. These client devices are often networked together and connected to the Internet using wireless network devices. In many cases, network devices utilize Wi-Fi wireless network standards. Wi-Fi standards have evolved over time to operate with various protocols, modulation schemes, and radio frequency bands. As Wi-Fi standards change, client devices and network devices adopt these new standards in order to provide better performance and reliability. These changes often require new hardware or software, and often result in additional costs.

The majority of today's client devices use Wi-Fi over 2.4 and 5 GHz bands. Client devices using the 6 GHz Wi-Fi band are just beginning to appear on the market. Network devices are also starting to support the 6 GHz band. However, prior-art systems and methods of enabling 6 GHz support often require additional hardware components, resulting in significant price differences of the end products. During this period when 6 GHz-enabled client devices are relatively few compared to 2.4 and 5 GHz-enabled clients, the additional cost for network devices to support the 6 GHz band can become a competitive market disadvantage.

A prior art system and method for supporting 2.4, 5, and 6 GHz bands in a network device will now be described in greater detail with reference to FIG. 1-2.

Figure 1:
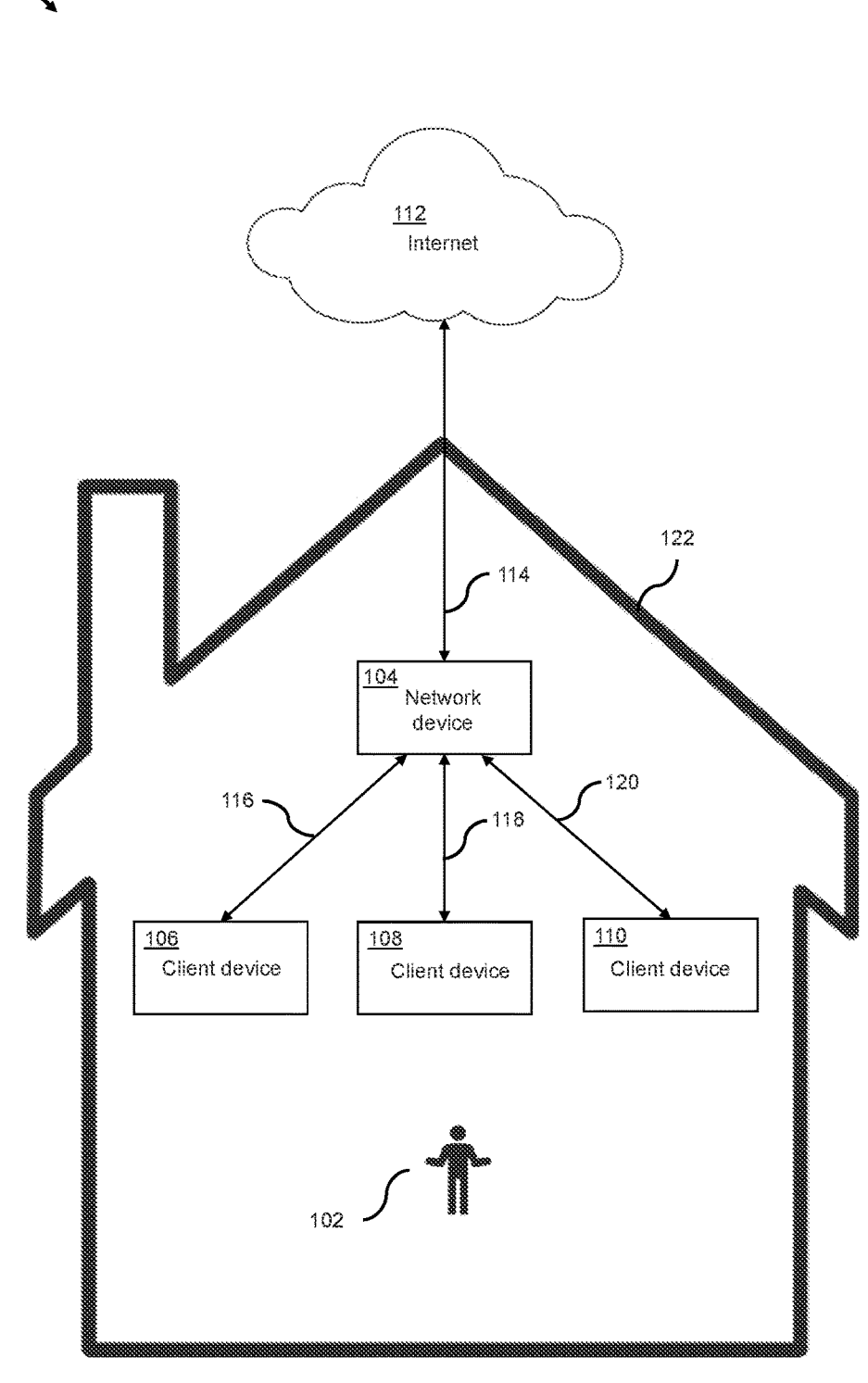
FIG. 1 illustrates a system of client devices connected to a network device.

FIG. 1 illustrates a prior art system 100 of client devices connected to a network device.

As shown in the figure, system 100 includes a user 102, a prior-art network device 104, client devices 106, 108, and 110, and Internet 112. User 102, prior-art network device 104, and client devices 106, 108, and 110 are disposed at location 122. Prior-art network device 104 is arranged to communicate with client device 106 by channel 116. Prior-art network device 104 is arranged to communicate with client device 108 by channel 118. Prior-art network device 104 is arranged to communicate with client device 110 by channel 120. Prior-art network device 104 is arranged to communicate with Internet 112 by channel 114.

Prior art network device 104 may be any device or system that is operable to allow data to flow from one discrete device or network to another. Prior art network device 104 may perform such functions as web acceleration and HTTP compression, flow control, encryption, redundancy switchovers, traffic restriction policy enforcement, data compression, TCP performance enhancements (e.g., TCP spoofing), quality of service functions (e.g., classification, prioritization, differentiation, random early detection, TCP/UDP flow control), bandwidth usage policing, dynamic load balancing, address translation, and routing. In this non-limiting example, prior art network device 104 may be a router, a gateway, an access point, an extender, or a mesh network device.

Client devices 106, 108, and 110 may be any devices or systems that present content to, accept inputs from, or directly or indirectly interact with user 102. In this non-limiting example, client devices 106, 108, and 110 may be smart phones, tablets, personal computers, TV set-top boxes, videogame consoles, smart media devices, home security devices, or Internet-of-Things (IoT) devices.

Internet 112 is a global set of interconnected computing resources and networks.

Channel 114 may be any device or system that facilitates communications between devices or networks. Channel 114 may include physical media or wiring, such as coaxial cable, optical fiber, or digital subscriber line (DSL); or wireless links, such as Wi-Fi, LTE, satellite, or terrestrial radio links; or a combination of any of these examples or their equivalents. The term "Wi-Fi" as used herein may be considered to refer to any of Wi-Fi 4, 5, 6, 6E, or any variation thereof. The data communicated on such networks can be implemented using a variety of protocols on a network such as a WAN, a virtual private network (VPN), a metropolitan area network (MAN), a system area network (SAN), a DOCSIS network, a fiber optics network (including fiber-to-the-home, fiber-to-the-X, or hybrid fiber-coax), a digital subscriber line (DSL), a public switched data network (PSDN), a global Telex network, or a 2G, 3G, 4G or 5G, for example. Though channel 114 is shown as a single link, it is contemplated that channel 114 may contain multiple links and devices, including access points, routers, gateways, and servers.

Channels 116, 118, and 120 may be any devices or systems that facilitate wireless communications between prior art network device 104 and client devices 106, 108, and 110 respectively. In this non-limiting example, channels 116, 118, and 120 are Wi-Fi bands.

In normal operation, prior art network device 104 enables data communications between Internet 112, client device 106, client device 108, and client device 110. User 102 may interact with client devices 106, 108, and 110 at various times and interaction levels. For purposes of discussion, suppose that user 102 is watching streaming video on client device 106, which requires a large amount of data bandwidth. Suppose that user 102 then stops watching video and starts browsing the Web on client device 108. In this case, bandwidth requirements are modest. Finally, suppose that client device 110 is a security camera that records video to a service based in Internet 112. The low resolution of typical security video means that bandwidth requirements of client device 110 are modest, but constant.

In this non-limiting example, client device 106 communicates to prior art network device 104 over channel 116 using a 5 GHz Wi-Fi band. Client device 108 communicates to prior art network device 104 over channel 118 using a 6 GHz Wi-Fi band. Client device 110 communicates to prior art network device 104 over channel 120 using a 2.4 GHz Wi-Fi band. In another non-limiting example, client device 106 communicates over channel 116 using a 5 GHz low Wi-Fi band and client device 108 communicates over channel 118 using a 5 GHz high Wi-Fi band.

FIG. 1 illustrates system 100 including prior art network device 104 and client devices 106, 108, and 110. Aspects of prior art network device 104 communicating with client devices 106, 108, and 110 will now be discussed with reference to FIG. 2.

Figure 2:
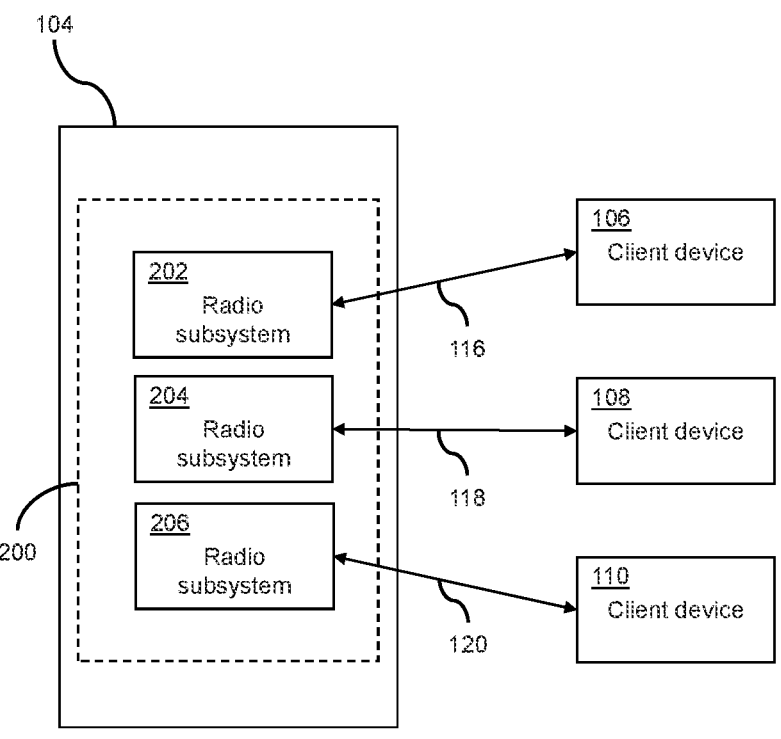
FIG. 2 illustrates a prior-art network device connected to client devices.

FIG. 2 illustrates prior-art network device 104 connected to client devices 106, 108, and 110.

As shown in the figure, network device 104 includes radio system 200. Radio system 200 includes radio subsystems 202, 204, and 206. Radio subsystem 202 is arranged to communicate with client device 106 by channel 116. Radio subsystem 204 is arranged to communicate with client device 108 by channel 118. Radio subsystem 206 is arranged to communicate with client device 110 by channel 120.

Referring to the example given in FIG. 1, suppose that channel 116 operates on 5 GHz, channel 118 operates on 6 GHz, and channel 120 operates on 2.4 GHz. In this prior-art example, radio subsystem 202 is utilized specifically to service channel 116 on 5 GHz; radio subsystem 204 is utilized specifically to service channel 118 on 6 GHz; and radio subsystem 206 is utilized specifically to service channel 120 on 2.4 GHz.

FIG. 2 illustrates prior-art network device 104, which utilizes three radio subsystems to operate on three bands. Prior-art network device 104 will therefore have an increased cost as attributed to the multiple difference radio subsystems that are required to support the 2.4 GHz, the 5 GHz and the 6 GHz bands. Further, for some users, this increased cost may not be justified as their home may not include client devices that support the 6 GHz band, wherein the radio subsystem providing the 6 GHz band is not being used. Further, in the future, for other users, this increased cost may not be justified as their home may no longer include client devices that support the 5 GHz band, wherein the radio subsystem providing the 5 GHz band will no longer be used.

What is needed is a system and method for supporting 2.4, 5, and 6 GHz bands in a network device while minimizing manufacturing costs.

A system and method in accordance with the present disclosure enables a network device to operate over several Wi-Fi bands using a common radio subsystem to minimize manufacturing costs.

In accordance with the present disclosure, a network device is used with several client devices over two wireless communications channels. The channels are of different radio frequency bands. The network device transmits/receives data to/from client devices over the first band for a period of time, then changes state in order to transmit/receive data to/from client devices over the second band for a period of time. The network device switches between the first and second bands according to the needs of the client devices.

An example system and method of operating a network device over two frequency bands in accordance with aspects of the present disclosure will now be described in greater detail with reference to FIGS. 3-7.

Aspects of a network device that utilizes two radio subsystems to operate on three bands in accordance with aspects of the present disclosure will now be discussed with reference to FIG. 3.

Figure 3:
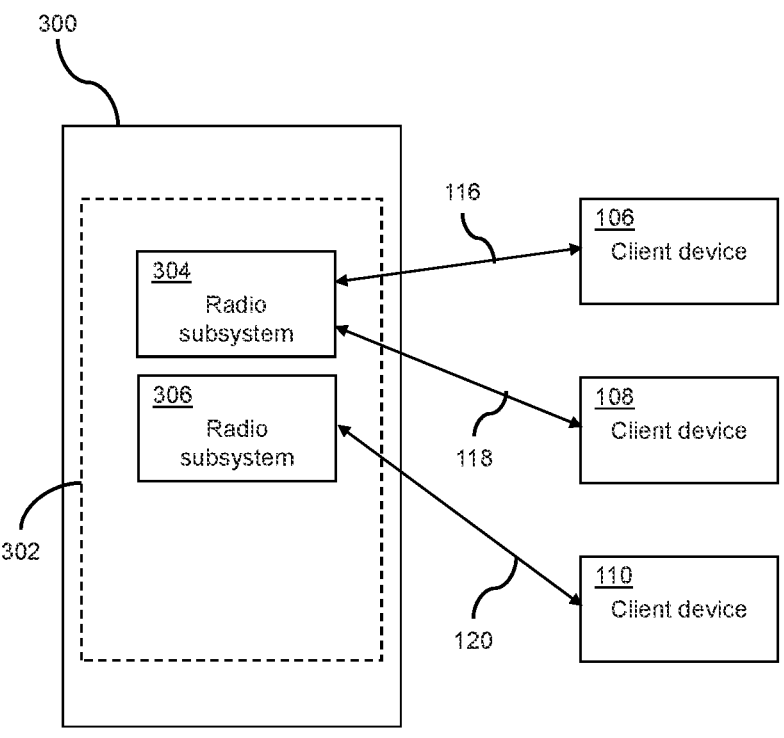
FIG. 3 illustrates a network device connected to client devices, in accordance with aspects of the present disclosure.

FIG. 3 illustrates network device 300 connected to client devices 106, 108, and 110, in accordance with aspects of the present disclosure. For purposes of discussion, network device 300 would replace prior art network device 104 within location 122.

As shown in the figure, network device 300 includes radio system 302. Radio system 302 includes radio subsystems 304 and 306. In this non-limiting example embodiments, radio system 302 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. It should be noted that a radio system in accordance with aspects of the present disclosure may operate in any number of different bands.

Radio subsystem 304 is arranged to communicate with client device 106 by channel 116 and with client device 108 by channel 118. This can be done by any method, a non-limiting example of which is disclosed in U.S. patent application Ser. No. 63/038,259, filed on Jun. 12, 2020, the entire disclosure of which is incorporated herein by reference.

Radio subsystem 306 is arranged to communicate with client device 110 by channel 120.

Referring to the example given in FIG. 1, suppose that channel 116 operates on 5 GHz, channel 118 operates on 6 GHz, and channel 120 operates on 2.4 GHz. In this non-limiting example, radio subsystem 304 is utilized to enable channel 116 on 5 GHz and channel 118 on 6 GHz. Radio subsystem 306 is utilized to enable channel 120 on 2.4 GHz.

In operation, radio subsystem 304 switches between operating on channel 116 during one time segment and channel 118 at another time segment. The switching of radio subsystem 304 between channels 116 and 118 will now be discussed with reference to FIG. 4.

Figure 4:
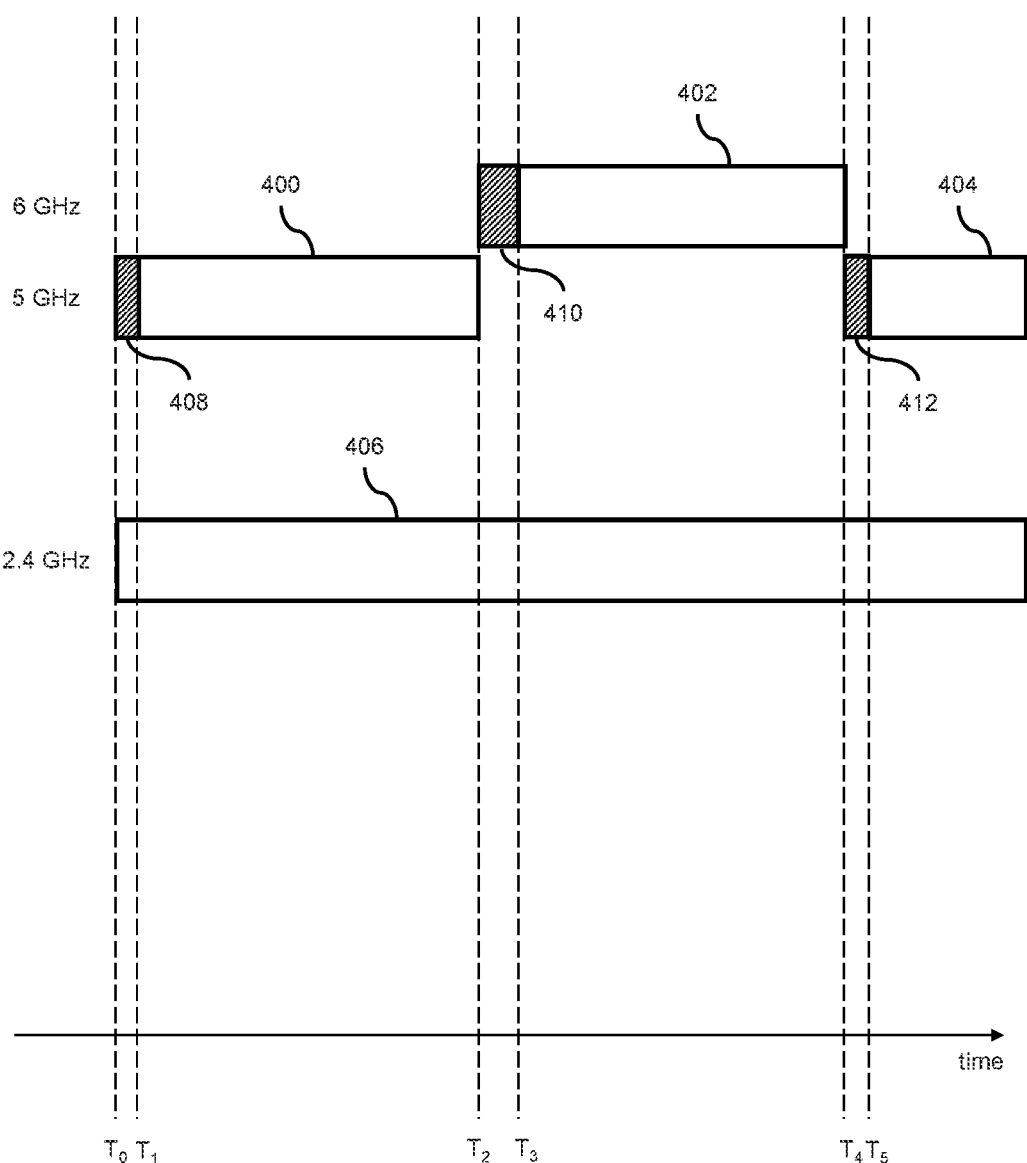
FIG. 4 illustrates time periods for which data is transmitted over several radio frequency bands, in accordance with aspects of the present disclosure.

FIG. 4 illustrates time periods for which data is transmitted over several radio frequency bands, in accordance with aspects of the present disclosure.

As shown in the figure: during periods 400 and 404, data is being transmitted on a 5 GHz band: during period 402, data is being is transmitted on a 6 GHz band; and during period 406 data is being transmitted on a 2.4 GHz band. Periods 400, 402, and 404 are preceded by time intervals 408, 410, and 412, respectively, which will be described in greater detail below.

The data transmitted during periods 400, 402, 404 and 408 include frames, which are digital data transmission units that carry information from one wireless device to another. Frames may comprise many types of information including addressing, protocol, user content, management, and status. Frames occupy finite durations of time in a given frequency band.

At time $T_0$ and referring to FIG. 3, radio subsystem 306 begins transmitting data within period 406 over channel 120 on the 2.4 GHz band. At time $T_1$, radio subsystem 304 operates in a first state wherein radio subsystem 304 initiates the transmission of data within period 400 over channel 116 on the 5 GHz band. As will be described in greater detail below, radio subsystem 304 will not actually start transmitting data within period 400 until after expiration of time interval 408. At time $T_2$, radio subsystem 304 switches from operation in the first state to operation in a second state, wherein radio subsystem 304 stops transmitting data within period 400 over channel 116 and initiates the transmission of data within period 402 over channel 118 on the 6 GHz band. As will be described in greater detail below, radio subsystem 304 will not actually start transmitting data within period 402 until after expiration of time interval 410. After expiration of time interval 410, at time $T_3$, radio subsystem 304 begins transmission of data within period 402 over channel 118 on the 6 GHz band. At time $T_4$, radio subsystem 304 switches from operation in the second state to operation in the first state, wherein radio subsystem 304 stops transmitting data within period 402 over channel 118 and initiates the transmission of data within period 404 over channel 116 on the 5 GHz band. As will be described in greater detail below, radio subsystem 304 will not actually start transmitting data within period 404 until after expiration of time interval 412. After expiration of time interval 412, at time $T_5$, radio subsystem 304 begins transmitting data within period 404 over channel 116 on the 5 GHz band.

FIG. 4 illustrates periods 400, 402, and 404 being transmitted over channels 116 and 118 using radio subsystem 304. Periods 400, 402, and 404 are interleaved, or multiplexed, in time. A method for multiplexing wireless periods on two channels in accordance with aspects of the present disclosure will now be discussed with reference to FIG. 5.

FIG. 5 illustrates method 500 of transmitting data over two frequency bands, in accordance with aspects of the present disclosure.

As shown in the figure, method 500 starts (S502) and settling time values are obtained (S504). This will now be discussed in greater detail with reference to FIGS. 6-7.

Figure 6:
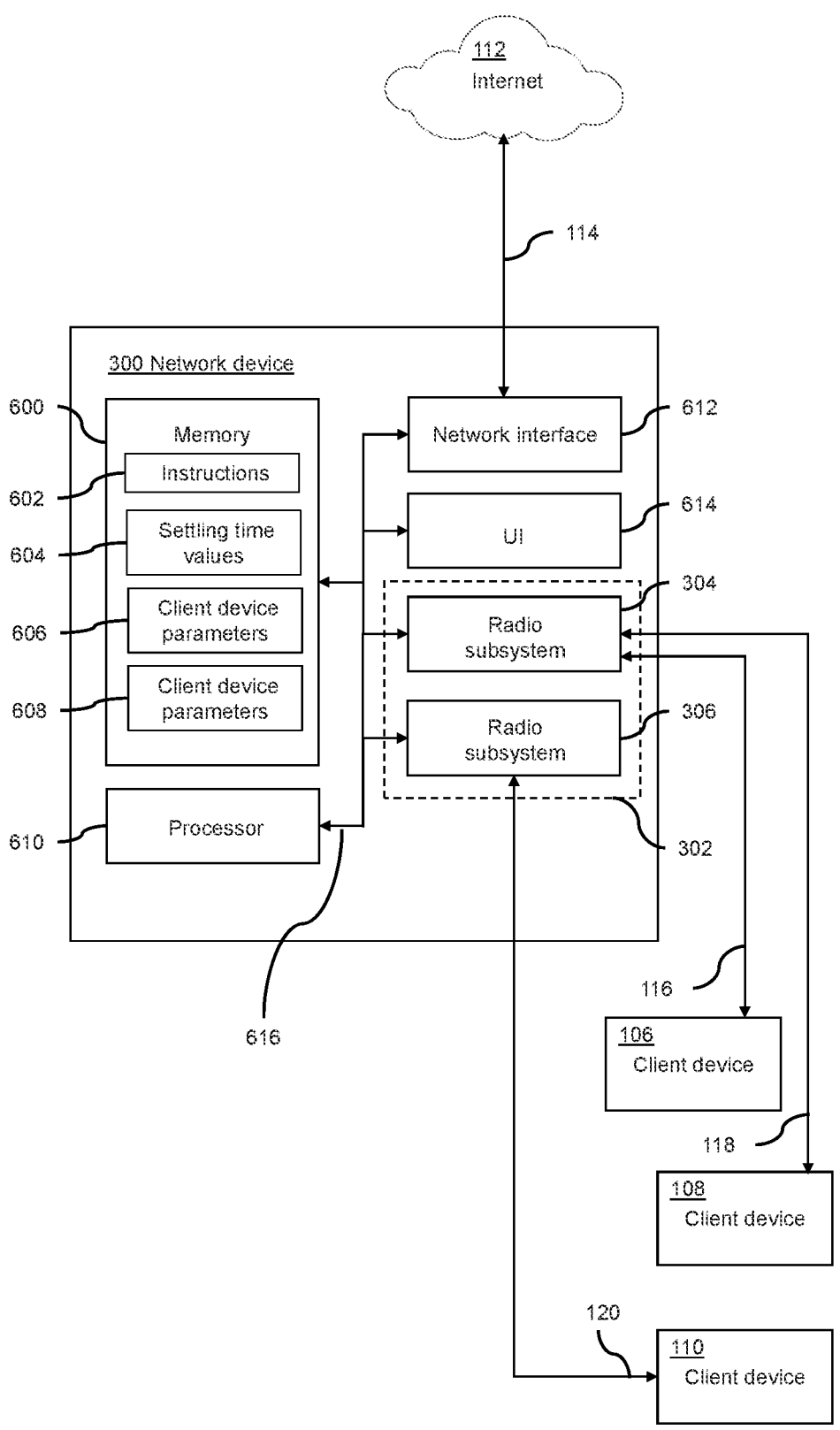
FIG. 6 illustrates a network device and client devices, in accordance with aspects of the present disclosure.

FIG. 6 illustrates aspects of network device 300 and client devices 106, 108, and 110, in accordance with aspects of the present disclosure.

As shown in the figure, network device 300 contains a memory 600, a processor 610, a network interface 612, a user interface (UI) 614, and radio system 302. Radio system 302 contains radio subsystems 304 and 306. Memory 600, processor 610, network interface 612, UI 614, radio subsystem 304, and radio subsystem 306 are connected by bus 616. Client device parameters 606, client device parameters 608, and settling time values 604 are contained in memory 600. Processor 610 is configured to execute instructions 602 stored in memory 600.

Processor 610 may be any device or system capable of controlling general operations of network device 300 and includes, but is not limited to, central processing units (CPUs), hardware microprocessors, single-core processors, multi-core processors, field-programmable gate arrays (FPGAs), microcontrollers, application-specific integrated circuits (ASICs), digital signal processors (DSPs), or other similar processing devices capable of executing any type of instructions, algorithms, or software for controlling the operations and functions of network device 300.

Memory 600 may be any device or system capable of storing data and instructions used by network device 300 and includes, but is not limited to, random-access memory (RAM), dynamic random-access memory (DRAM), hard drives, solid-state drives, read-only memory (ROM), erasable programmable read-only memory (EPROM), electrically erasable programmable read-only memory (EEPROM), flash memory, embedded memory blocks in FPGAs, or any other various layers of memory hierarchy.

As will be described in greater detail below, instructions 602 includes instructions, that when executed by processor 610, cause network device 300 to monitor a first client device parameter associated with client device 106; monitor a second client device parameter associated with client device 108; determine a portion of time for which radio system 304 should be configured to operate in a first channel state based on the monitored first client device parameter and the monitored second client device parameter; generate a control signal to place radio system 304 in the first channel state based on the determined portion of time; transmit the control signal to radio system 304 via a control line to place radio system 304 in the first channel state.

In some embodiments, as will be described in greater detail below, instructions 602 additionally includes instructions, that when executed by processor 610, cause network device 300 to generate a MAC device control signal to place radio system 304 in the first channel state based on the determined portion of time; generate an RF module control signal to place radio system 304 in the first channel state based on the determined portion of time; generate a PHY device control signal to place radio system 304 in the first channel state based on the determined portion of time; transmit the MAC device control signal to a MAC device via a MAC device control line to place radio system 304 in the first channel state; transmit the RF module control signal to an RF module via an RF module control line to place radio system 304 in the first channel state; and transmit the PHY device control signal to a PHY device via a PHY device control line to place radio system 304 in the first channel state.

In some embodiments, as will be described in greater detail below, instructions 602 additionally includes instructions, that when executed by processor 610, cause network device 300 to generate a second control signal to switch radio system 304 from the first channel state to the second channel state based on the portion of time; and transmit the second control signal to radio system 304 via the control line to switch radio system 304 from the first channel state to the second channel state and to cause radio system 304 to operate in the second channel state after a settling time associated with a settling time value.

Network interface 612 may be any device or system used to establish and maintain channel 114. Network interface 612 can include one or more connectors, such as RF connectors, Ethernet connectors, wireless communications circuitry such as 5G transceivers, and one or more antennas. Network interface 612 transmits and receives data from Internet 112 by known methods, non-limiting examples of which include terrestrial antenna, satellite dish, wired cable, DSL, optical fiber, or 5G as discussed above.

UI 614 may be any device or system capable of presenting information and accepting user inputs on network device 300 and includes, but is not limited to, liquid crystal displays (LCDs), thin film transistor (TFT) displays, light-emitting diodes (LEDs), touch screens, buttons, microphones, and speakers.

In this example, processor 610, memory 600, network interface 612, UI 614, and radio system 302 are illustrated as individual devices of network device 300. However, in some embodiments, at least two of processor 610, memory 600, network interface 612, UI 614, and radio system 302 may be combined as a unitary device. Further, in some embodiments, at least one of processor 610, memory 600, network interface 612, UI 614, and radio system 302 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to processor 610 such that processor 610 may read information from, and write information to, the tangible computer-readable media. In the alternative, the tangible computer-readable media may be integral to processor 610. Processor 610 and the tangible computer-readable media may reside in an integrated circuit (IC), an ASIC, or large scale integrated circuit (LSI), system LSI, super LSI, or ultra LSI components that perform a part or all of the functions described herein. In the alternative, processor 610 and the tangible computer-readable media may reside as discrete components.

Example tangible computer-readable media may be also coupled to systems, non-limiting examples of which include a computer system/server, which is operational with numerous other general-purpose or special-purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Bus 616 may be any device or system that provides data communications between memory 600, processor 610, network interface 612, UI 614, and radio system 302. Bus 616 can be one or more of any of several types of bus structures, including a memory bus or a memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Instructions 602 operate the functions of network device 300, including communicating with Internet 112 and client devices 106, 108, and 110. Instructions 602, having a set (at least one) of program modules, may be stored in memory 600 by way of example, and not limitation, as well as an operating system, one or more application programs, other program modules, and program data. Each of the operating systems, one or more application programs, other program modules, and program data or some combination thereof, may include an implementation of a networking environment. The program modules generally carry out the functions and/or methodologies of various embodiments of the application as described herein.

Client device parameters 606 and client device parameters 608 describe the communications requirements of client device 106 and 108, respectively. In this non-limiting example, client device parameters 606 comprise modulation and coding schemes (MCS), bandwidth requirements, and latency requirements of client device 106. Similarly, client device parameters 608 comprise MCS, bandwidth requirements, and latency requirements of client device 108.

Settling time values 604 characterize time-domain behavior of radio subsystem 304 when switching from one channel state to another and will be discussed in further detail with reference to FIG. 7.

Figure 7:
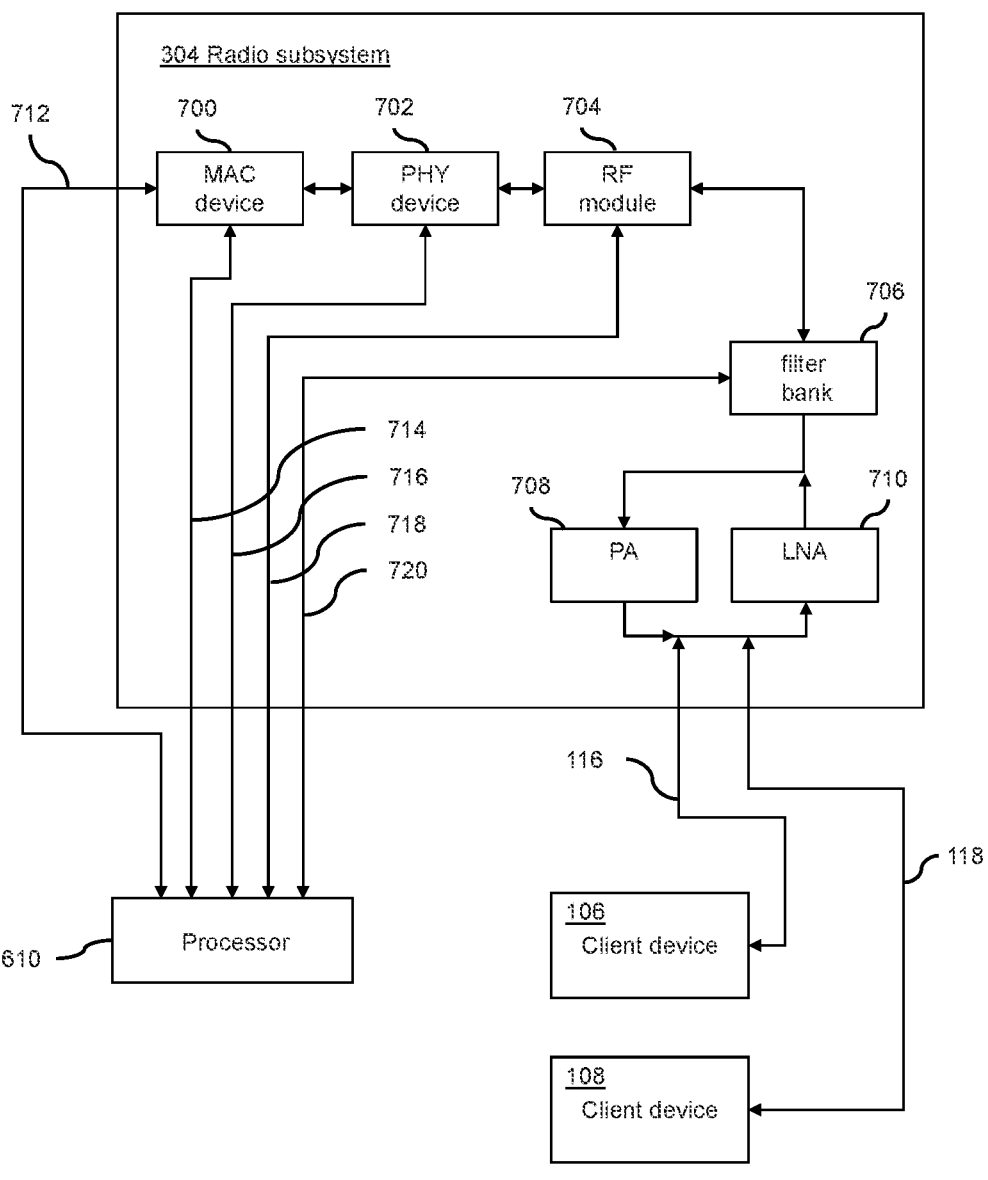
FIG. 7 illustrates a radio subsystem, in accordance with aspects of the present disclosure.

FIG. 7 illustrates radio subsystem 304, in accordance with aspects of the present disclosure.

As shown in the figure, radio subsystem 304 contains a MAC device 700, a PHY device 702, an RF module 704, a filter bank 706, a power amplifier (PA) 708, and a low noise amplifier (LNA) 710. MAC device 700 is controlled by processor 610 via a MAC device control line 714. PHY device 702 is controlled by processor 610 via a PHY device control line 716. RF module 704 is controlled by processor 610 via an RF module control line 718. Filter bank 706 is controlled by processor 610 via a filter bank control line 720. Processor 610 sends data to and receives data from radio subsystem 304 on line 712.

MAC device 700 may be any device or system configured to manage the link layer of a communications protocol stack. In this non-limiting example, MAC device 700 maintains a list of network names, or Service Set IDentifiers (SSIDs), configured on a Wi-Fi band. MAC device 700 also maintains a list of devices, or stations (STAs), configured on each SSID. MAC device control line 714 controls whether MAC device 700 is operating on a 5 GHz band or a 6 GHz band.

PHY device 702 may be any device or system configured to code and modulate digital data onto a communications medium. In this non-limiting example, PHY device 702 transforms digital data into an analog baseband signal when transmitting and transforms an analog baseband signal into digital data when receiving. PHY device control line 716 controls whether PHY device 702 is operating on a 5 GHz band or a 6 GHz band.

RF module 704 may be any device or system that transforms an analog baseband signal to and from wireless communications bands. In this non-limiting example, RF module 704 upconverts a baseband signal provided by PHY device 702 into a radio frequency signal at 5 or 6 GHz when transmitting; and downconverts a radio frequency signal from 5 or 6 GHz to baseband when receiving. RF module control line 718 controls whether RF module 704 is operating on a 5 GHz band or a 6 GHz band.

Filter bank 706 may be any device or system that attenuates certain frequency ranges to improve radio communications performance. In this non-limiting example, filter bank control line 720 controls whether filter bank 706 operates as a 5 GHz bandpass filter or as a 6 GHz bandpass filter.

PA 708 and LNA 710 may be any devices or systems that amplify a radio signal. In this non-limiting example, PA 708 amplifies the power of the Wi-Fi signal being transmitted by radio subsystem 304; LNA 710 amplifies the power of the Wi-Fi signal being received by radio sub system 304.

Though MAC device 700 and PHY device 702 are illustrated as separate components, it is contemplated that MAC device 700 and PHY device 702 may be combined into a single device. Similarly, though RF module 704, filter bank 706, PA 708, and LNA 710 are illustrated as separate components, it is contemplated that two or more of RF module 704, filter bank 706, PA 708, and LNA 710 may be combined into a single device. Furthermore, though filter bank 706 is illustrated as disposed between RF module 704 and PA 708 and LNA 710, it is contemplated that the order of components may differ in other implementations. In another non-limiting example, PA 708 and LNA 710 are disposed between RF module 704 and filter bank 706.

Though MAC device control line 714, PHY device control line 716, RF module control line 718, and filter bank control line 720 are illustrated as separate lines, it is contemplated that two or more of MAC device control line 714, PHY device control line 716, RF module control line 718, and filter bank control line 720 may be combined, or incorporated into other components such as bus 616.

Radio subsystem 304 can be switched to operate in one channel state or another. In this non-limiting example, radio subsystem 304 can be switched to operate in a 5 GHz band or in a 6 GHz band.

In operation, and with reference to FIG. 6, processor 610 executes instructions 602 stored on memory 600 causing a MAC device control signal to be sent on MAC device control line 714, a PHY device control signal to be sent on PHY device control line 716, an RF module control signal to be sent on RF module control line 718, and a filter bank control signal to be sent on filter bank control line 720 to place radio subsystem 304 into one channel state or another.

In operation, switching channel states does not occur instantaneously; in this non-limiting example, MAC device 700 has to exchange one set of SSIDs and STAs for another; PHY device 702 has to be configured with modulation and coding schemes of the new channel state; and RF module 704 and filter bank 706 must allow transient signals to decay and stabilize. This time interval is characteristic of each channel state and radio subsystem components and is described by settling time values 604, which is stored in memory 600.

Referring to FIG. 4, transmission of data within period 400 on 5 GHz begins at time $T_1$. Time interval 408 represents the settling time $T_1$-$T_0$ required for radio subsystem 304 to acquire and calibrate to the 5 GHz band. Transmission of period 400 on 5 GHz ends at time $T_2$. Time interval 410 represents the settling time $T_3$-$T_2$ required for radio subsystem 304 to acquire and calibrate to the 6 GHz band before transmission of data within period 402 on 6 GHz begins at time $T_3$. Transmission of period 402 ends at time $T_4$. Time interval 412 represents the settling time $T_5$-$T_4$ required before transmission of data within period 404 begins at time $T_5$. In this non-limiting example, time intervals 408 and 412 are identical as they are both characteristic of switching radio subsystem 304 to the 5 GHz band. Referring to FIG. 6, settling time values 604 may be pre-calculated and stored in memory 600, and may be re-calculated periodically to account for varying conditions on channels 116 and 118.

Referring to FIG. 6, processor 610 retrieves settling time values 604 stored in memory 600.

Returning to FIG. 5, after settling time values are obtained (S504), first client device parameters are monitored (S506) and second client device parameters are monitored (S508). For example, as shown in FIG. 6, network device 300 monitors Wi-Fi communications capabilities and requirements of client devices 106 and 108 and stores these parameters as client device parameters 606 and 608, respectively, in memory 600. Other parameters that may be monitored include beacon requests.

Returning to FIG. 5, after first client device parameters are monitored (S506) and second client device parameters are monitored (S508), the time slices are determined (S510). Referring to FIG. 6, processor 610 executes instructions 602 which use settling time values 604 and client device parameters 606 and 608 to calculate times that radio subsystem 304 switches from one channel state to another. Allocation of time slices to the first channel or second channel may depend on factors including the number of client devices on each channel, Wi-Fi capabilities of each client device, and bandwidth requirements of client devices.

Returning to FIG. 5, after time slices are determined (S510), control signals are sent to place network device 300 in the first channel state (S512). Referring to FIG. 7, processor 610 sends a MAC device control signal on MAC device control line 714, a PHY device control signal on PHY device control line 716, an RF module control signal on RF module control line 718, and a filter bank control signal on filter bank control line 720 to place radio subsystem 304 in a state that supports the first Wi-Fi band. In operation and referring to FIG. 4, the MAC device control signal, the PHY device control signal, the RF module control signal, and the RF module control signal are sent at time $T_0$. In another non-limiting example, the MAC device control signal, the PHY device control signal, the RF module control signal, and the RF module control signal are sent at different times slightly before or after time $T_0$.

Returning to FIG. 5, after control signals are sent to place network device 300 in the first channel state (S512), a time interval corresponding to the settling time of the first channel is allowed to pass (S514). Referring to FIG. 4, time interval 408 occurs, wherein MAC device 700 has to set up one set of S SIDs and STAs for transmission of data on channel 116 in the 5 GHz band; and PHY device 702 has to be configured with modulation and coding schemes for transmission of data on channel 116 in the 5 GHz band.

Returning to FIG. 5, after the time interval corresponding to the settling time of the first channel is allowed to pass (S514), data is transmitted during the first time slice (S516). Referring to FIG. 4, transmission of data within period 400 begins at time $T_1$. Referring to FIG. 7, processor 610 sends transmission data on line 712 to radio subsystem 304, which transmits data within period 400 on channel 116 to client device 106.

Returning to FIG. 5, after data is transmitted during the first time slice (S516), transmission of the first time slice ends, and control signals are sent to place network device 300 in the second channel state (S518). Referring to FIG. 7, processor 610 sends a MAC device control signal on MAC device control line 714, a PHY device control signal on PHY device control line 716, an RF module control signal on RF module control line 718, and a filter bank control signal on filter bank control line 720 to place radio subsystem 304 in a state that supports a second Wi-Fi band. Referring to FIG. 4, the MAC device control signal, the PHY device control signal, the RF module control signal, and the RF module control signal are sent on or around time $T_2$.

Returning to FIG. 5, after control signals are sent to place network device 300 in the second channel state (S518), a time interval corresponding to the settling time of the second channel is allowed to pass (S520). Referring to FIG. 4, time interval 410 occurs, wherein MAC device 700 has to exchange the set of SSIDs and STAs for transmission of data on channel 116 in the 5 GHz band to a new set of SSIDs and STAs for transmission of data on channel 118 in the 6 GHz band; PHY device 702 has to be reconfigured with modulation and coding schemes for transmission of data on channel 118 in the 6 GHz band; and RF module 704 and filter bank 706 allow transient signals from the previous communications on channel 116 in the 5 GHz band to decay and stabilize.

Returning to FIG. 5, after the time interval corresponding to the settling time of the second channel is allowed to pass (S520), data is transmitted during the second time slice (S522). Referring to FIG. 4, transmission of data within period 402 begins at time $T_3$. Referring to FIG. 7, processor 610 sends transmission data on line 712 to radio subsystem 304, which transmits during period 402 on channel 118 to client device 108.

Returning to FIG. 5, after data is transmitted during the second time slice (S522), transmission of the second time slice completes and method 500 ends (S524).

Today's home and work environments contain many Internet-enabled devices that are commonly networked using Wi-Fi. As Wi-Fi standards evolve, network devices and client devices are required to support new protocols. However, supporting new standards and features often requires additional or upgraded hardware components, resulting in increased prices. In particular, the addition of the 6 GHz frequency band is challenging. Prior-art network devices use individual radio subsystems to operate in specific frequency bands; hence a network device operating in 2.4, 5, and 6 GHz bands would require three separate radio subsystems. The cost of adding a separate radio subsystem for 6 GHz is significant, especially in the interim when the number of 6 GHz-enabled client devices is low.

In accordance with the present disclosure, a network device uses one radio subsystem to communicate with client devices on two Wi-Fi bands. These two Wi-Fi bands can be flexibly configured to support 5 and 6 GHz, or 5 GHz low and high bands. The network device can transmit and receive on one frequency band, change the state of its radio subsystem, then transmit and receive on a different frequency band. The network device interleaves the frequency bands in time, and algorithmically determines optimum durations for operating in either band.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A network device for use with a first client device and a second client device, the first client device being configured to transmit first client device transmission data on a first channel and to receive first client device reception data on the first channel, the second client device being configured to transmit second client device transmission data on a second channel and to receive second client device reception data on the second channel, the first channel being different from the second channel, said network device comprising:

a memory;

a radio system controllably configured to operate in a first channel state of a plurality of channel states or a second channel state of the plurality of channel states, the first channel state enabling transmission of the first client device reception data on the first channel and reception of the first client device transmission data on the first channel, the second channel state enabling transmission of the second client device reception data on the second channel and reception of the second client device transmission data on the second channel;

a control line arranged to provide a control signal to said radio system so as to place said radio system in either the first channel state or the second channel state; and a processor configured to execute instructions stored on said memory to cause said network device to:

obtain one or more settling times for each of the plurality of channel states, wherein each channel state of the plurality of channel states is associated with a different channel;

monitor a first client device parameter associated with the first client device, wherein the first client device parameter describes one or more first communications requirements of the first client device;

monitor a second client device parameter associated with the second client device, wherein the second client device parameter describes one or more second communications requirements of the second client device;

determine a portion of time for which said radio system should be configured to operate in the first channel state based on the monitored first client device parameter and the monitored second client device parameter;

generate the control signal to place said radio system in the first channel state based on the determined portion of time;

transmit the control signal to said radio system via said control line to place said radio system in the first channel state-; and transmit a first data on the first channel after allowing a first time interval corresponding to a first settling time of the one or more settling times to pass.

2. The network device of claim 1,
wherein said radio system comprises:

a medium access control (MAC) device configured to manage a link layer and frames associated with the first client device transmission data, the first client device reception data, the second client device transmission data, and the second client device reception data;

a physical layer (PHY) device configured to modulate the frames associated with the first client device transmission data and the second client device transmission data and to demodulate the frames associated with the first client device reception data and the second client device reception data;

a radio frequency (RF) module configured to associate the first client device transmission data to the first channel, disassociate the first client device reception data from the first channel, associate the second client device transmission data to the second channel, and disassociate the second client device reception data from the second channel;

a filter bank being controllably configured to operate in the first channel state or the second channel state;

a power amplifier configured to amplify the first client device transmission data and the second client device transmission data; and a low noise amplifier operable to amplify the first client device reception data and the second client device reception data; and wherein said control line is arranged to provide the control signal to said filter bank so as to place said filter bank in either the first channel state or the second channel state.

3. The network device of claim 2, further comprising:
a MAC device control line;

an RF module control line; and
a PHY device control line;

wherein said processor is configured to execute instructions stored on said memory to additionally cause said network device to:

generate a MAC device control signal to place said radio system in the first channel state based on the determined portion of time;

generate an RF module control signal to place said radio system in the first channel state based on the determined portion of time;

generate a PHY device control signal to place said radio system in the first channel state based on the determined portion of time;

transmit the MAC device control signal to said MAC device via said MAC device control line to place said radio system in the first channel state;

transmit the RF module control signal to said RF module via said RF module control line to place said radio system in the first channel state; and transmit the PHY device control signal to said PHY device via said PHY device control line to place said radio system in the first channel state.

4. The network device of claim 1, wherein said radio system is configured to operate in a first GHz band in the first state and to operate in a second GHz band in the second state.

5. The network device of claim 4, wherein said radio system is further configured to operate in a third GHz band while operating in the first state or the second state.

6. The network device of claim 1, wherein said processor is configured to execute instructions stored on said memory to additionally cause said network device to:

generate a second control signal to switch said radio system from the first channel state to the second channel state based on the portion of time; and transmit the second control signal to said radio system via said control line to switch said radio system from the first channel state to the second channel state and to cause said radio system to operate in the second channel state after a second settling time of the one or more settling times associated with a settling time value.

7. The network device of claim 6, wherein said memory has the second settling time value stored therein.

8. A method of using a network device with a first client device and a second client device, the first client device being configured to transmit first client device transmission data on a first channel and to receive first client device reception data on the first channel, the second client device being configured to transmit second client device transmission data on a second channel and to receive second client device reception data on the second channel, the first channel being different from the second channel, said method comprising:

obtaining one or more settling times for each of a plurality of channel states, wherein each channel state of the plurality of channel states is associated with a different channel;

monitoring, via a processor configured to execute instructions stored on a memory, a first client device parameter associated with the first client device, wherein the first client device parameter describes one or more first communications requirements of the first client device;

monitoring, via the processor, a second client device parameter associated with the second client device, wherein the second client device parameter describes one or more second communications requirements of the second client device;

determining, via the processor, a portion of time for which a radio system should be configured to operate in a first channel state of a plurality of channel states based on the monitored first client device parameter and the monitored second client device parameter, the radio system being controllably configured to operate in the first channel state or the second channel state, the first channel state enabling transmission of the first client device reception data on the first channel and reception of the first client device transmission data on the first channel, a second channel state of a plurality of channel states enabling transmission of the second client device reception data on the second channel and reception of the second client device transmission data on the second channel;

generating, via the processor, the control signal to place the radio system in the first channel state based on the determined portion of time;

transmitting, via the processor, the control signal to the radio system via a control line to place the radio system in the first channel state; and transmitting, via the processor, a first data on the first channel after allowing a first time interval corresponding to a first settling time of the one or more settling times to pass.

9. The method of claim 8,
wherein the radio system comprises:
a medium access control (MAC) device configured to manage a link layer and frames associated with the first client device transmission data, the first client device reception data, the second client device transmission data, and the second client device reception data;
a physical layer (PHY) device configured to modulate the frames associated with the first client device transmission data and the second client device transmission data and to demodulate the frames associated with the first client device reception data and the second client device reception data;
a radio frequency (RF) module configured to associate the first client device transmission data to the first channel, disassociate the first client device reception data from the first channel, associate the second client device transmission data to the second channel, and disassociate the second client device reception data from the second channel;
a filter bank being controllably configured to operate in the first channel state or the second channel state;
a power amplifier configured to amplify the first client device transmission data and the second client device transmission data; and
a low noise amplifier operable to amplify the first client device reception data and the second client device reception data; and
wherein said transmitting the control signal comprises transmitting the control signal to the filter bank so as to place the filter bank in either the first channel state or the second channel state.

10. The method of claim 9, further comprising:
generating, via the processor, a MAC device control signal to place the radio system in the first channel state based on the determined portion of time;

generating, via the processor, an RF module control signal to place the radio system in the first channel state based on the determined portion of time;

generating, via the processor, a PHY device control signal to place the radio system in the first channel state based on the determined portion of time;

transmitting, via the processor, the MAC device control signal to the MAC device via a MAC device control line to place the radio system in the first channel state;

transmitting, via the processor, the RF module control signal to the RF module via a RF module control line to place the radio system in the first channel state; and transmitting, via the processor, the PHY device control signal to the PHY device via a PHY device control line to place the radio system in the first channel state.

11. The method of claim 8, wherein the radio system is configured to operate in a first GHz band in the first state and to operate in a second GHz band in the second state.

12. The method of claim 11, further comprising operating the radio system in a third GHz band while operating in the first state or the second state.

13. The method of claim 8, further comprising:
generating, via the processor, a second control signal to switch the radio system from the first channel state to the second channel state based on the portion of time; and
transmitting, via the processor, the second control signal to the radio system via the control line to switch the radio system from the first channel state to the second channel state and to cause the radio system to operate in the second channel state after a second settling time of the one or more settling times associated with a settling time value.

14. The method of claim 13, wherein the memory has the settling time value stored therein.

15. A non-transitory, computer-readable media having computer-readable instructions stored thereon, the computer-readable instructions being capable of being read by a network device for use with a first client device and a second client device, the first client device being configured to transmit first client device transmission data on a first channel and to receive first client device reception data on the first channel, the second client device being configured to transmit second client device transmission data on a second channel and to receive second client device reception data on the second channel, the first channel being different from the second channel, wherein the computer-readable instructions are capable of instructing the network device to perform the method comprising:
obtaining one or more settling times for each of a plurality of channel states, wherein each channel state of the plurality of channel states is associated with a different channel;
monitoring, via a processor configured to execute instructions stored on a memory, a first client device parameter associated with the first client device, wherein the first client device parameter describes one or more first communications requirements of the first client device;
monitoring, via the processor, a second client device parameter associated with the second client device, wherein the second client device parameter describes one or more second communications requirements of the second client device;
determining, via the processor, a portion of time for which a radio system should be configured to operate in a first channel state of a plurality of channel states based on the monitored first client device parameter and the monitored second client device parameter, the radio system being controllably configured to operate in the first channel state or a second channel state of the plurality of channel states, the first channel state enabling transmission of the first client device reception data on the first channel and reception of the first client device transmission data on the first channel, the second channel state enabling transmission of the second client device reception data on the second channel and reception of the second client device transmission data on the second channel;

generating, via the processor, the control signal to place the radio system in the first channel state based on the determined portion of time;

transmitting, via the processor, the control signal to the radio system via a control line to place the radio system in the first channel state; and transmitting, via the processor, a first data on the first channel after allowing a first time interval corresponding to a first settling time of the one or more settling times to pass.

16. The non-transitory, computer-readable media of claim 15, wherein the computer-readable instructions are capable of instructing the network device to perform the method wherein the radio system comprises:

a medium access control (MAC) device configured to manage a link layer and frames associated with the first client device transmission data, the first client device reception data, the second client device transmission data, and the second client device reception data;

a physical layer (PHY) device configured to modulate the frames associated with the first client device transmission data and the second client device transmission data and to demodulate the frames associated with the first client device reception data and the second client device reception data;

a radio frequency (RF) module configured to associate the first client device transmission data to the first channel, disassociate the first client device reception data from the first channel, associate the second client device transmission data to the second channel, and disassociate the second client device reception data from the second channel;

a filter bank being controllably configured to operate in the first channel state or the second channel state;

a power amplifier configured to amplify the first client device transmission data and the second client device transmission data;

a low noise amplifier operable to amplify the first client device reception data and the second client device reception data; and wherein said transmitting the control signal comprises transmitting the control signal to the filter bank so as to place the filter bank in either the first channel state or the second channel state.

17. The non-transitory, computer-readable media of claim 16, wherein the computer-readable instructions are capable of instructing the network device to perform the method comprising:

generating, via the processor, a MAC device control signal to place the radio system in the first channel state based on the determined portion of time;

generating, via the processor, an RF module control signal to place the radio system in the first channel state based on the determined portion of time;

generating, via the processor, a PHY device control signal to place the radio system in the first channel state based on the determined portion of time;

transmitting, via the processor, the MAC device control signal to the MAC device via a MAC device control line to place the radio system in the first channel state;

transmitting, via the processor, the RF module control signal to the RF module via a RF module control line to place the radio system in the first channel state; and transmitting, via the processor, the PHY device control signal to the PHY device via a PHY device control line to place the radio system in the first channel state.

18. The non-transitory, computer-readable media of claim 15, wherein the computer-readable instructions are capable of instructing the network device to perform the method wherein the radio system is configured to operate in a first GHz band in the first state and to operate in a second GHz band in the second state.

19. The non-transitory, computer-readable media of claim 18, wherein the computer-readable instructions are capable of instructing the network device to perform the method further comprising operating the radio system in a third GHz band while operating in the first state or the second state.

20. The non-transitory, computer-readable media of claim 15, wherein the computer-readable instructions are capable of instructing the network device to perform the method further comprising:

generating, via the processor, a second control signal to switch the radio system from the first channel state to the second channel state based on the portion of time; and transmitting, via the processor, the second control signal to the radio system via the control line to switch the radio system from the first channel state to the second channel state and to cause the radio system to operate in the second channel state after a second settling time of the one or more settling times associated with a settling time value.

21. The non-transitory, computer-readable media of claim 20, wherein the computer-readable instructions are capable of instructing the network device to perform the method wherein the memory has the settling time value stored therein.

* * * * *